(12) United States Patent
Krauss et al.

(10) Patent No.: US 7,409,885 B2
(45) Date of Patent: Aug. 12, 2008

(54) METHOD FOR CONTROLLING A TWIN-CLUTCH TRANSMISSION

(75) Inventors: Christian Krauss, Köln (DE); Michael Schwekutsch, Hilden (DE)

(73) Assignee: Getrag Ford Transmissions GmbH, Köln (DE)

( * ) Notice: Subject to any disclaimer, the term of this patent is extended or adjusted under 35 U.S.C. 154(b) by 217 days.

(21) Appl. No.: 10/567,414

(22) PCT Filed: Aug. 12, 2004

(86) PCT No.: PCT/EP2004/051786

§ 371 (c)(1),
(2), (4) Date: Feb. 6, 2006

(87) PCT Pub. No.: WO2005/019676

PCT Pub. Date: Mar. 3, 2005

(65) Prior Publication Data

US 2006/0236798 A1    Oct. 26, 2006

(30) Foreign Application Priority Data

Aug. 14, 2003 (EP) .................................. 03102543

(51) Int. Cl.
*F16H 3/38* (2006.01)

(52) U.S. Cl. .............................. 74/340; 74/330; 74/331; 477/74; 477/77; 477/79; 477/86; 477/174; 477/176

(58) Field of Classification Search .................. None
See application file for complete search history.

(56) References Cited

U.S. PATENT DOCUMENTS

| 5,997,433 | A | 12/1999 | Domian et al. | |
|---|---|---|---|---|
| 6,209,406 | B1* | 4/2001 | Sperber et al. | 74/330 |
| 6,463,821 | B1* | 10/2002 | Reed et al. | 74/330 |
| 6,887,184 | B2* | 5/2005 | Buchanan et al. | 477/174 |
| 7,025,707 | B2* | 4/2006 | Katakura | 477/123 |
| 7,094,176 | B2* | 8/2006 | Budal et al. | 477/5 |

FOREIGN PATENT DOCUMENTS

| DE | 3812327 | 6/1989 |
|---|---|---|
| DE | 19751456 | 5/1999 |
| DE | 10015296 | 8/2001 |
| DE | 10043060 | 4/2002 |
| DE | 10156940 | 5/2003 |
| EP | 1271007 | 1/2003 |
| EP | 1357309 | 10/2003 |

* cited by examiner

*Primary Examiner*—David D. Le
(74) *Attorney, Agent, or Firm*—Joan Pennington

(57) ABSTRACT

The invention concerns a method of controlling a twin-clutch transmission (10). When the torque transmitted in a first transmission path (C1, E2, Z8, Z9, S2, Z3, Z4) reaches an upper limit given by the torque transmission capacity of that path further additional torque produced by an engine at the drive shaft (I) is transmitted by closure of the second clutch (C2) to the output shaft (O) in parallel relationship by way of a second transmission path (C2, E1, Z1, Z2, S1, Z3, Z4). That permits the output of the engine to be better utilised and makes it possible to achieve better travel characteristics.

10 Claims, 10 Drawing Sheets

METHOD FOR CONTROLLING A TWIN-CLUTCH TRANSMISSION

Figure 1:
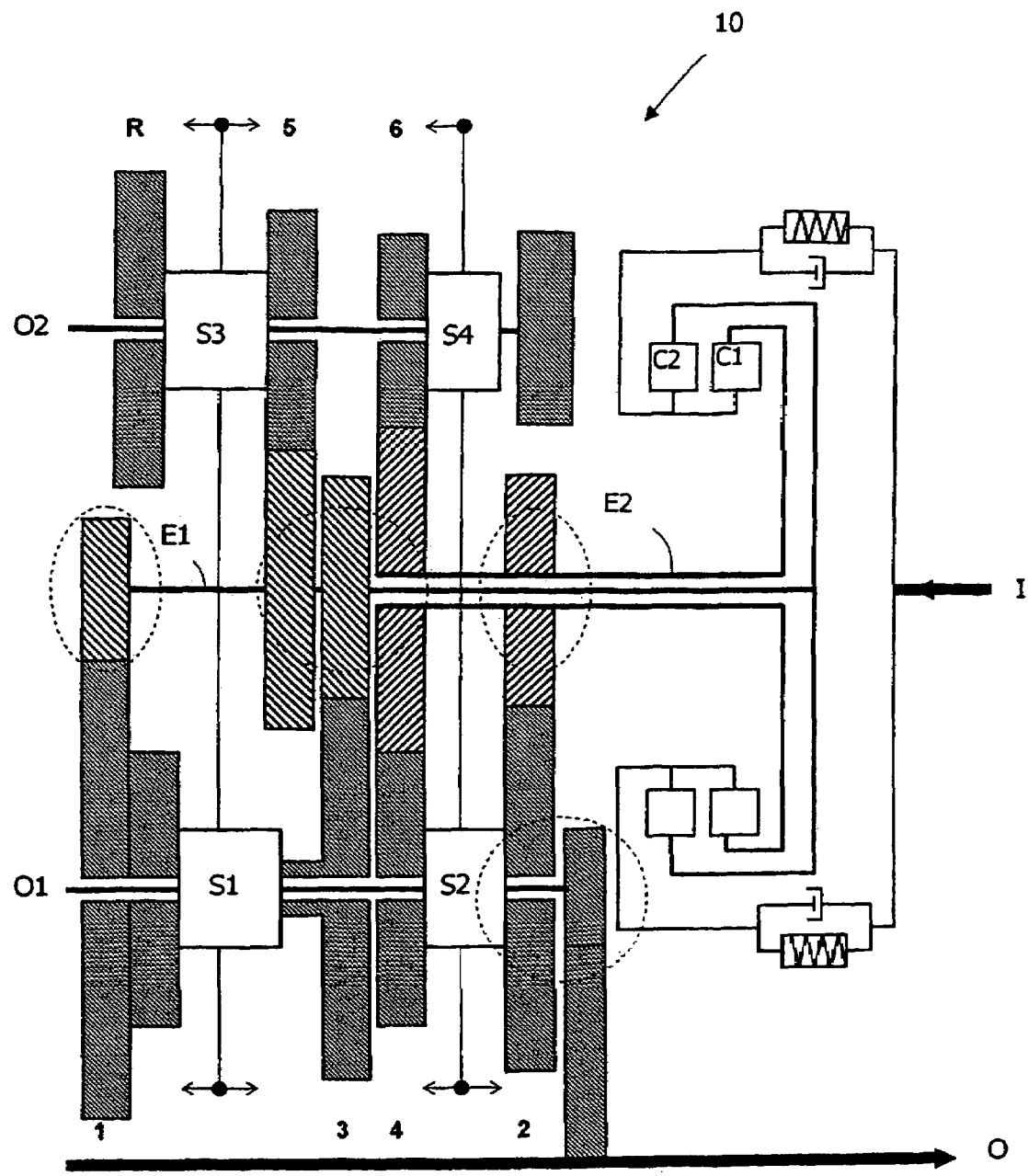

The invention concerns a method of controlling a twin-clutch transmission, wherein torque is transmitted from a drive shaft to an output shaft by way of a first clutch and by way of a first transmission path. The invention further concerns a twin-clutch transmission which is adapted to carry out such a method.

DE 38 12 327 A1 discloses a twin-clutch transmission in which, while a vehicle is starting, with clutch slip, besides the transmission path of the first gear the transmission path of the second gear is also activated. That is intended to provide that the heat losses caused by the slip are distributed to two clutches and therefore damage to the clutch of the first gear is avoided. As soon as rotary speed equality is reached at one of the clutches the associated transmission path is deactivated.

DE 101 56 940 A1 describes a similar process when starting off in order to achieve a higher level of vehicle acceleration.

It is known from DE 100 43 060 A1 to monitor the temperature of the active clutch of a twin-clutch transmission and to activate a second transmission path when there is a threat of thermal overloading.

In addition it is known that transmission paths must be protected from exceeding their torque capacity. Particularly in the low gears the torque which can be transmitted at a maximum by a transmission is generally lower than the maximum torque of the engine. Therefore the engine is usually adjusted downward in its power delivery in dependence on the engaged gear in order to protect the transmission. A disadvantage here is that the corresponding power potential of the engine is wasted unused.

Having regard to that background the object of the present invention was to permit improved transmission of power from an engine by way of a transmission.

That object is attained by a method having the features of claim 1 and by a twin-clutch transmission having the features of claim 14. Advantageous configurations are set forth in the appendant claims.

The method according to the invention serves to control a twin-clutch transmission, wherein by definition a twin-clutch transmission has (at least) two separately actuable clutches, by way of which different transmission paths between a drive shaft and an output shaft of the transmission can be activated. The basic starting point for the method is a condition in which (in general initially exclusively) torque is transmitted from the drive shaft to the output shaft by way of a first clutch and a first transmission path. In accordance with the method then a second clutch of the twin-clutch transmission is at least partially closed in order by way of a second transmission path to transmit an additional torque from the drive shaft to the output shaft when the torque transmitted by way of the first clutch and the first transmission path reaches a predetermined upper limit. The magnitude of the torque transmitted by way of the first transmission path can in that case be detected for example by a measurement operation or can be deduced from suitable operating parameters of the vehicle. The above-mentioned upper limit of that torque is so selected as to ensure protection for the first transmission path from a torque overloading. Typically the upper limit is predetermined in dependence on the currently prevailing operating parameters, in particular the gear stage of the first transmission path.

The described method provides protection for a twin-clutch transmission from a torque overloading insofar as, when required, an additional transmission path for the engine torque is afforded. Then, by means of the additional torque, the power capacity of the engine can be further utilised (generally up to its maximum) without the transmission having to be designed to be mechanically stronger and thus heavier and more costly. Better utilisation of the engine power is appropriate in particular in the lower gears as they typically involve the lowest torque transmission capacity. The method therefore permits in particular a faster start and acceleration.

Preferably the method provides that the first and second clutches are operated in the slip mode during the parallel transmission of a torque in the first transmission path and an additional torque in the second transmission path. By virtue thereof it is possible for the torque flows to be distributed in virtually self-regulating fashion to the two paths which are operating in parallel relationship. In addition potentially destructive effects due to a fixedly closed clutch are avoided.

In principle it is possible for the transmission of an additional torque by way of the second transmission path to be concluded as soon as the total torque transmitted from the drive shaft to the output shaft is again in the range of the capacity of the first transmission path. Preferably however the parallel activity of the first and second transmission paths is maintained until the transmission switches over from the first transmission path to a new transmission path.

It is further preferred that the second transmission path which is selected for transmission of the additional torque (for example by suitable setting of sliding shift sleeves) corresponds to the next higher gear stage in relation to the first transmission path. In that case a simple upward shift leads out of the first transmission path into the second transmission path. That is particularly advantageous as the second transmission path is already at the working point and the switching shift can thus take place without further delay.

In the method the second clutch is advantageously closed at most to such an extent that the additional torque transmitted in the second transmission path does not exceed a predetermined upper limit, the upper limit preferably depending on the operating condition (in particular the gear stage of the second transmission path). That ensures that the limited torque capacity of the second transmission path is also observed.

In accordance with another development of the method the first clutch by way of which by definition in the currently prevailing operating condition of the transmission the torque is primarily or exclusively transmitted from the drive shaft to the output shaft is operated permanently with a slight slip. Alternatively the above-mentioned first clutch can also be put into a condition with a slight amount of slip only in the event of a (predicted or occurred) increase in the demand for power. Advantageously in both cases, that is to say the permanent and the induced operating mode with a slight degree of slip in respect of the first clutch, the second clutch, with the second transmission path, is activated in parallel relationship (more specifically typically also with slip). The described measures provide that the transmission is prepared in optimum fashion for an increase in power in respect of which an additional torque must be quickly adopted by the second transmission path in order to make best possible use of the engine.

In another embodiment of the method the first transmission path corresponds to a higher (for example the second) gear stage and the second transmission path corresponds to a lower (for example the first) gear stage of the transmission. Such a configuration is suitable in particular for starting in the second gear which can be involved under given conditions (for example in winter). In that case the additional torque is transmitted by way of the first gear, which has the advantage that it is already prepared for a possible transmission back shift.

Other developments of the invention concern distribution of the engine torque to two transmission paths by regulating the clutches in relation to predetermined target or reference speeds for their transmission-side speeds, in which case both clutches are operated in a slip mode. For a more detailed discussion of those approaches, attention is directed to the related specific description.

The invention further concerns a twin-clutch transmission comprising at least two clutches for the transmission of torque from a drive shaft to an output shaft by way of different selectable transmission paths. The transmission further includes a control means for actuation of the clutches, which is adapted to carry out a method of the above-described kind. In other words, the control means at least partially closes a second clutch in order to transmit an additional torque by way of a second transmission path when the torque transmitted by way of the currently active first clutch and a first transmission path exceeds a predetermined upper limit. In a twin-clutch transmission which is designed in that way, the parallel transmission paths which are present in any case are thus utilised for making optimum use of the torque which the engine can provide.

In accordance with a development of the twin-clutch transmission it has two different output gears (for example pinions), by way of which torque can be transmitted to an axle transmission (for example differential). As such a gear frequently represents the weak point in a transmission path, the entire torque transmission capacity of the transmission is correspondingly increased by the provision of two gears.

In addition, in the twin-clutch transmission, the quotient between the transmission ratio of the first gear and the transmission ratio of the second gear (and/or between the transmission ratio of the second gear and the transmission ratio of the third gear) is preferably less than 2.0:1, particularly preferably less than 1.5:1. If for example the second gear has a transmission ratio of $i_2=2$, that of the first gear is preferably less than 4 ($i_1<4$, that is to say $i_1:i_2<2.0:1$), particularly preferably less than 3 ($i_1<3$, that is to say $i_1:i_2<1.5:1$).

Figure 2:
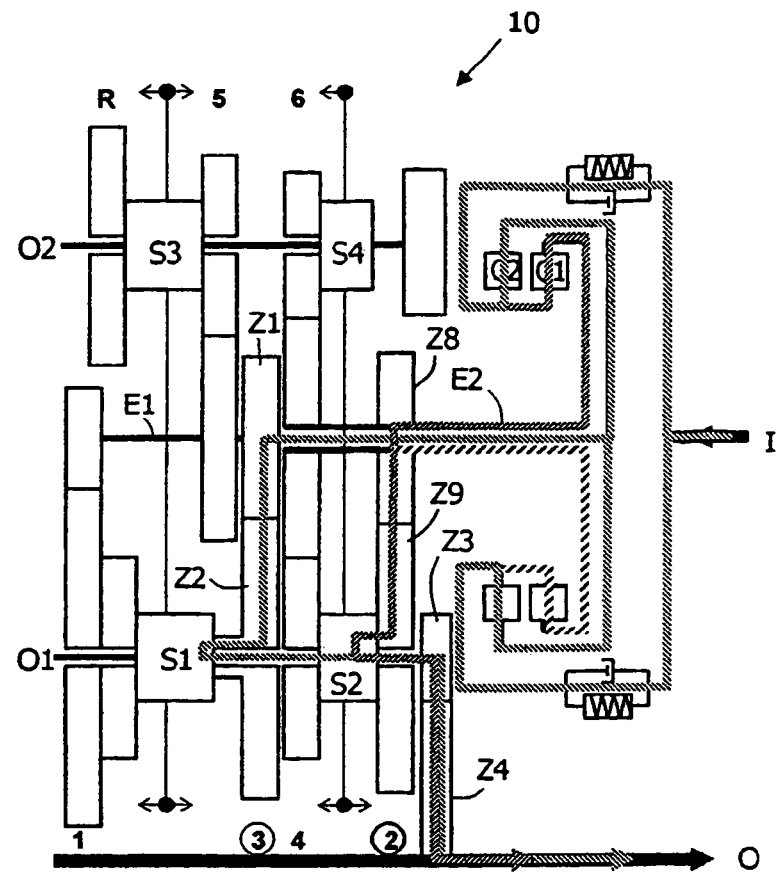
Figure 3:
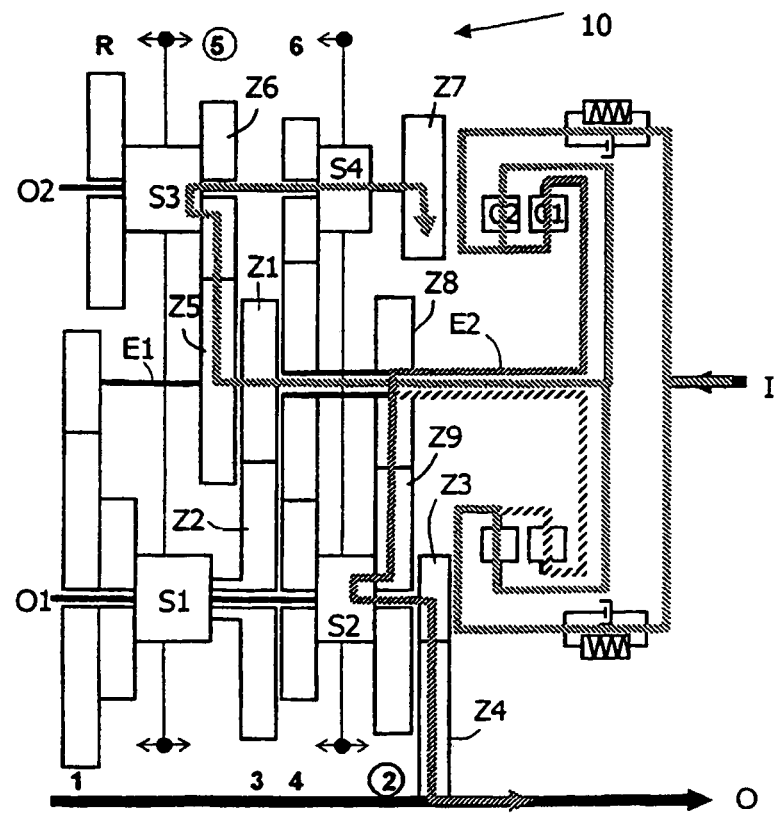
Figure 4:
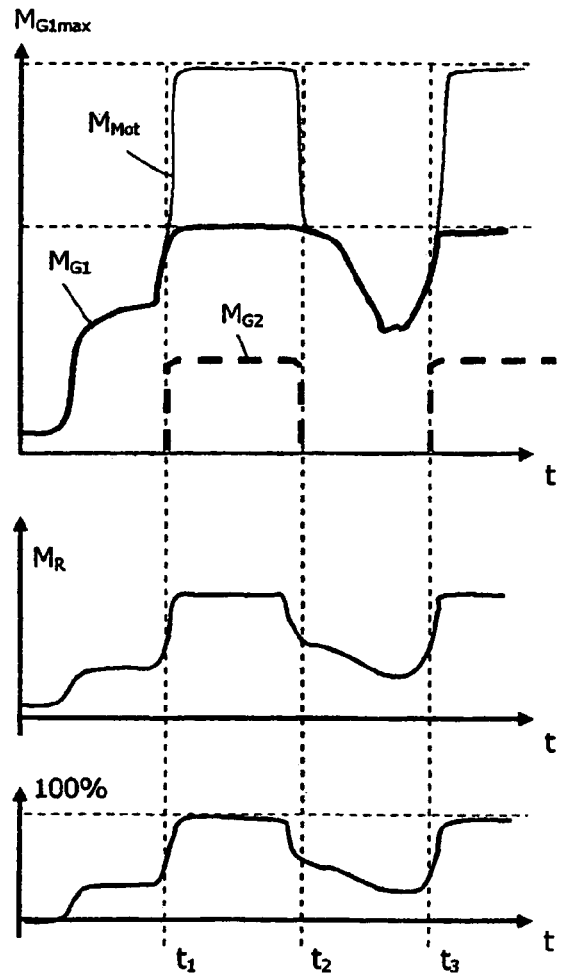
Figure 5:
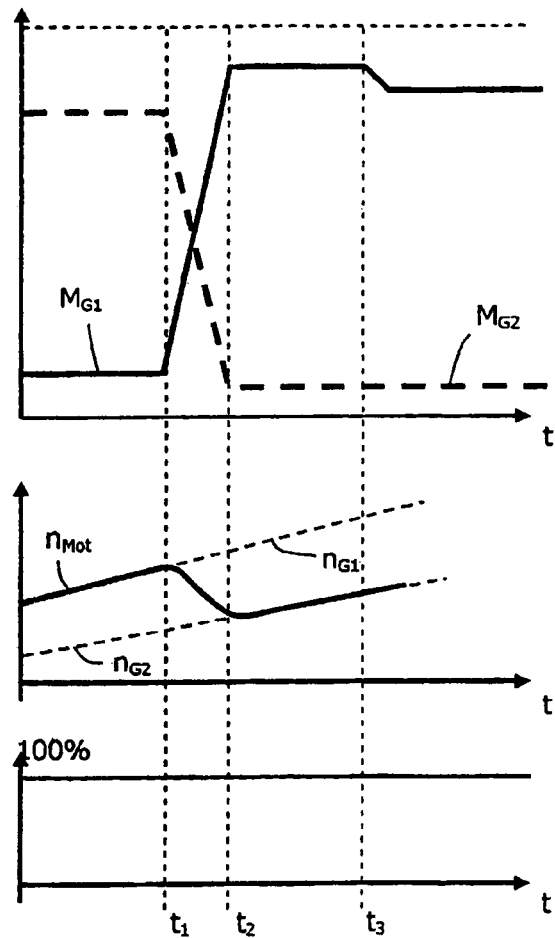
Figures 6, 7:
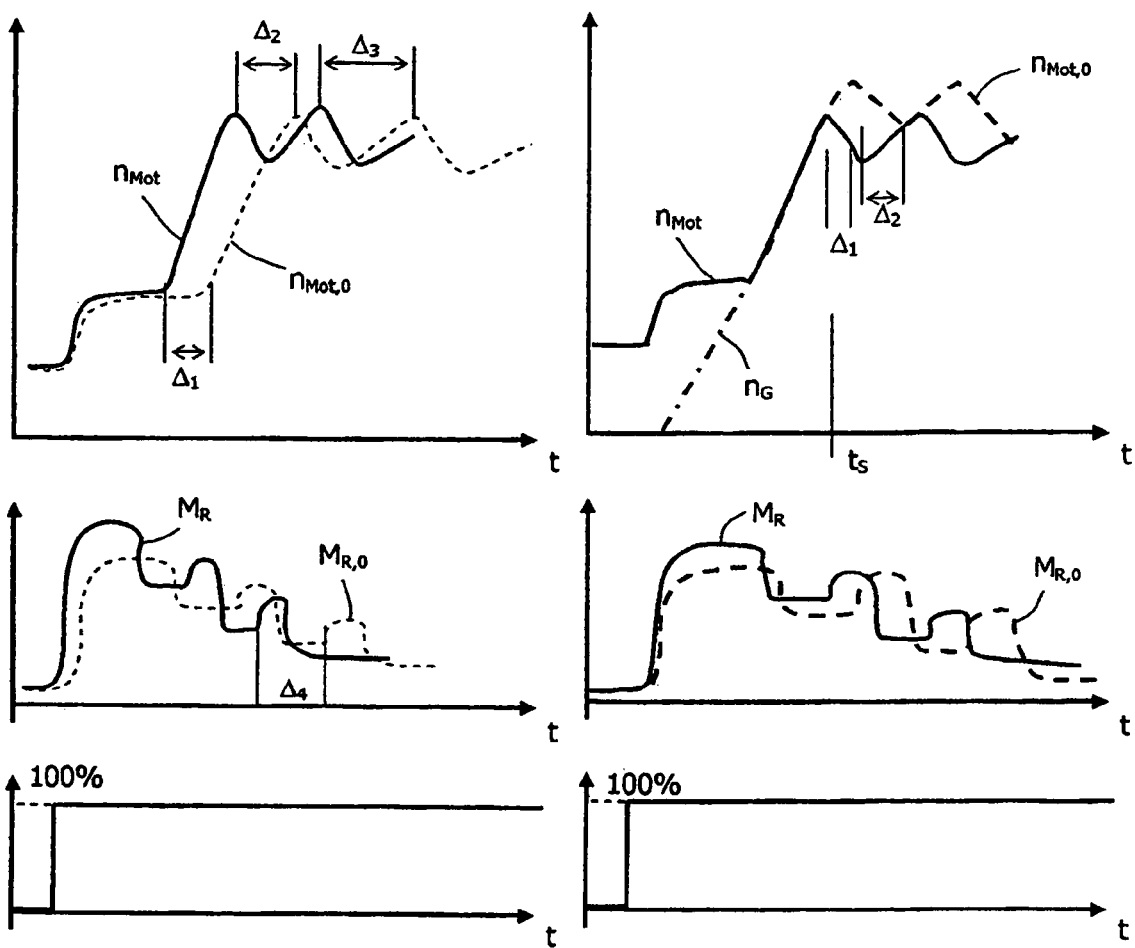
Figure 8:
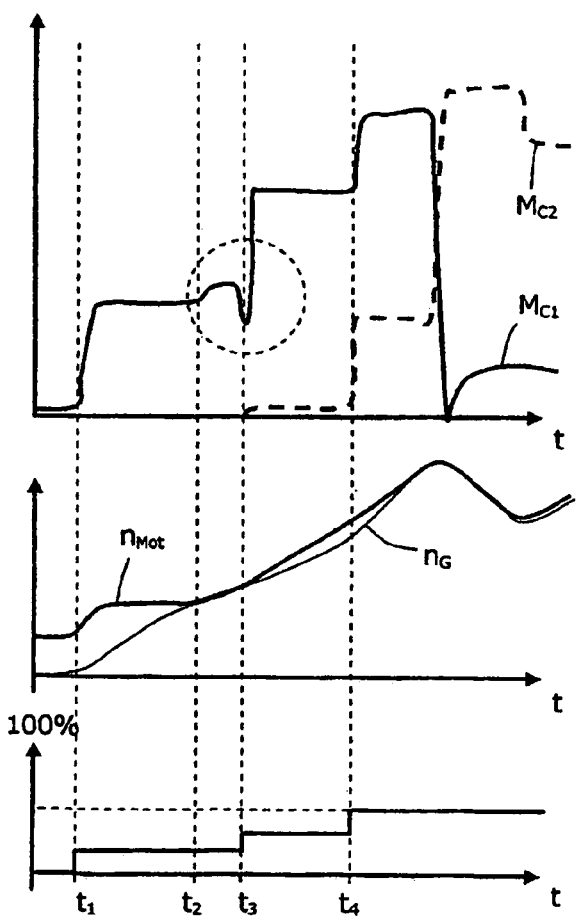
Figure 9:
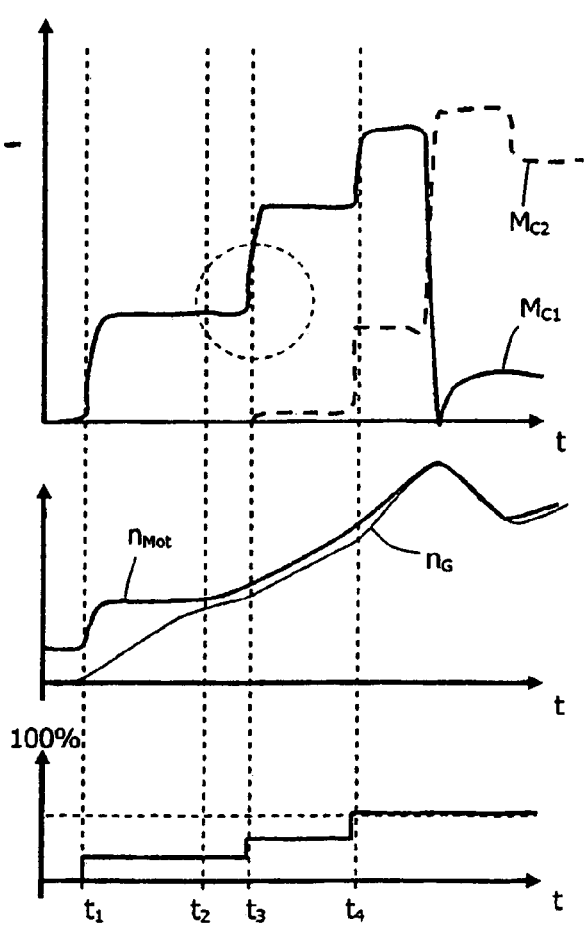
Figure 10:
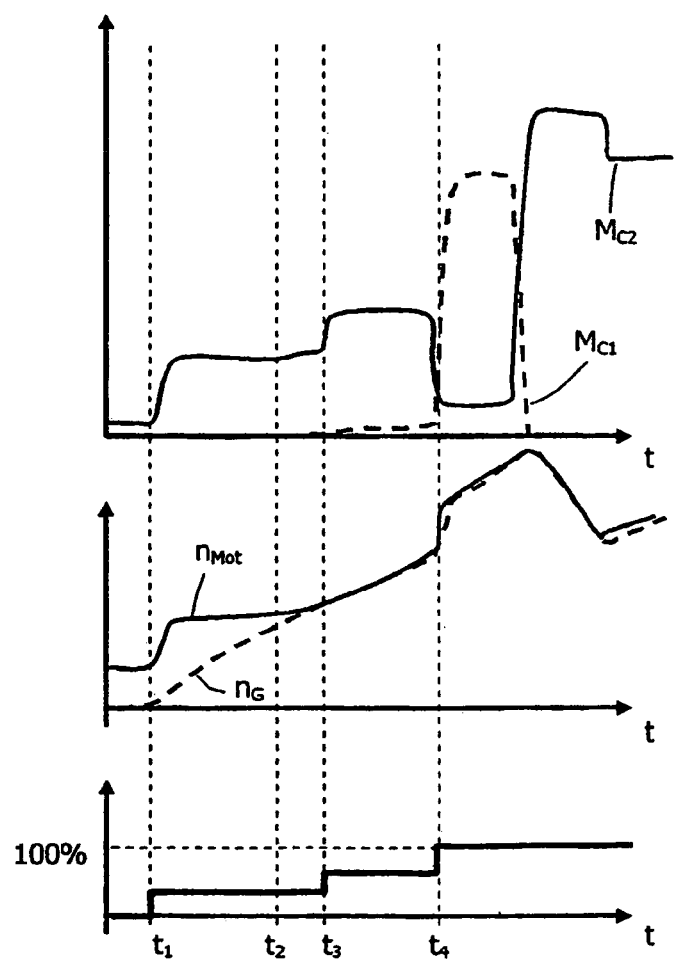
Figure 11:
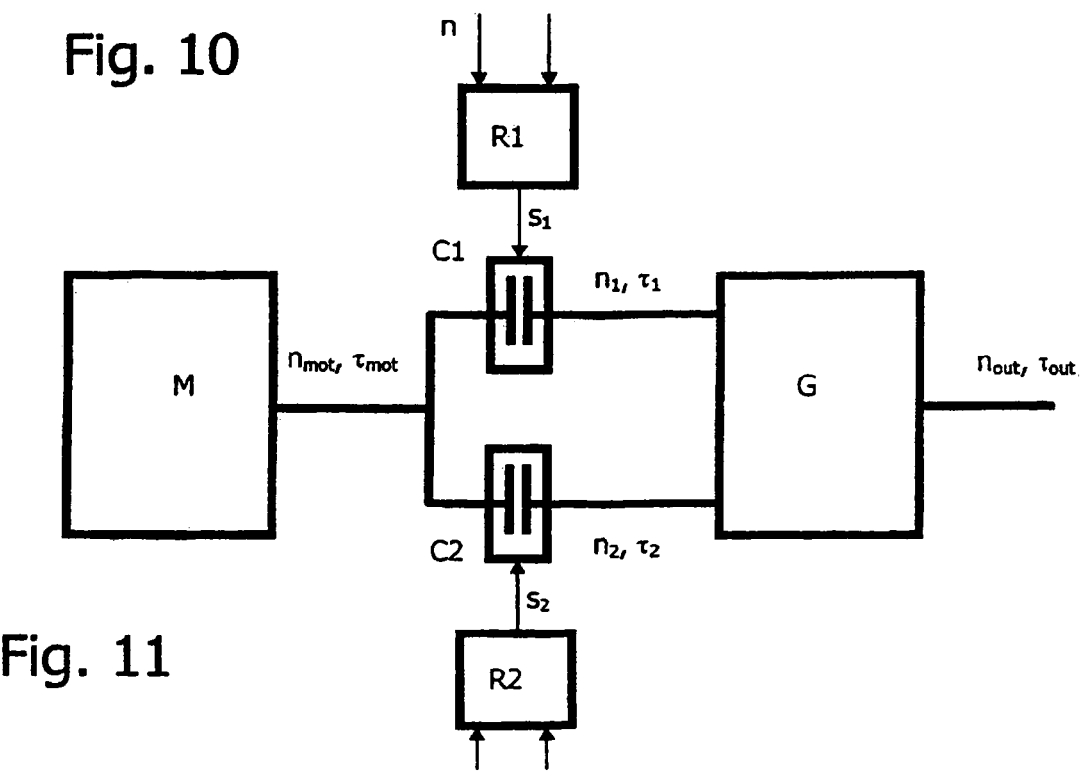
Figure 12:
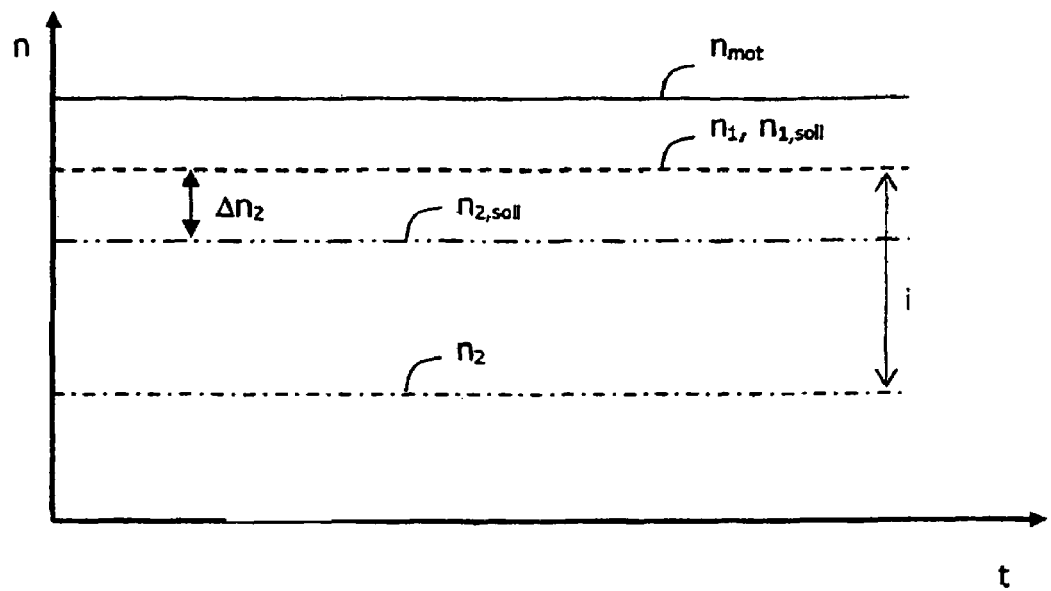
Figure 13:
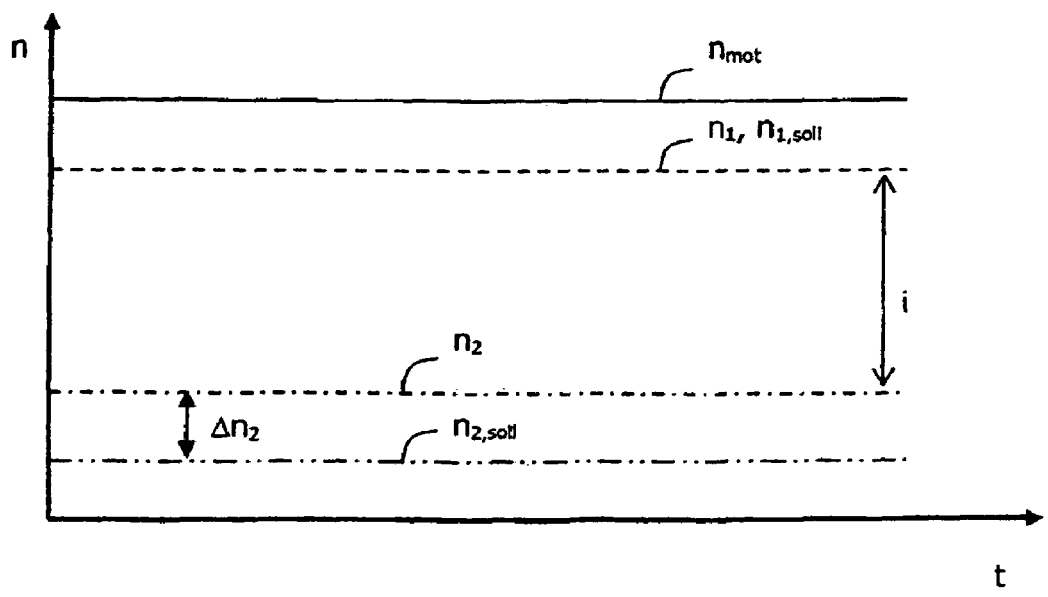
Figure 14:
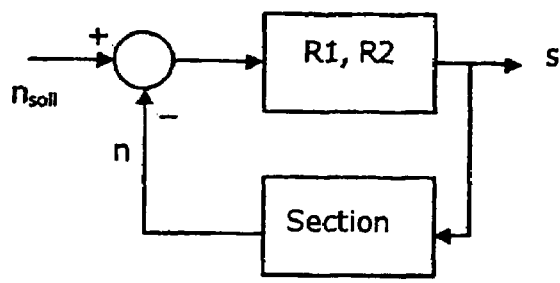
Figure 14:
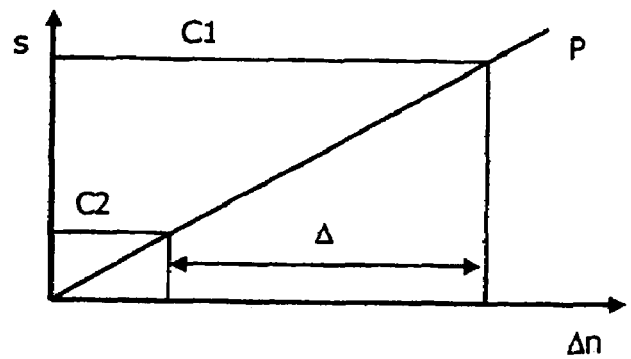
Figure 15:
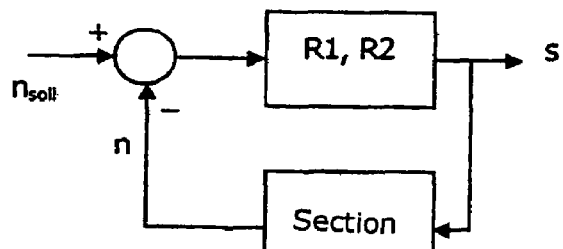
Figure 15:
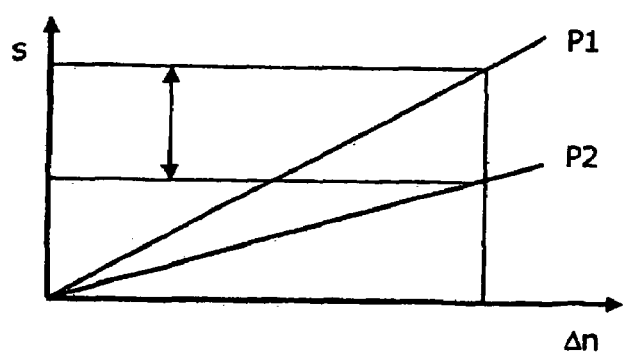
Figure 16:
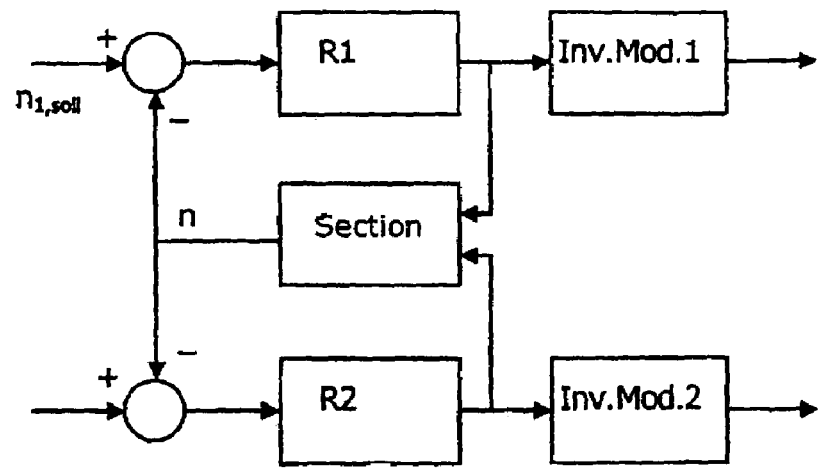
Figure 17:
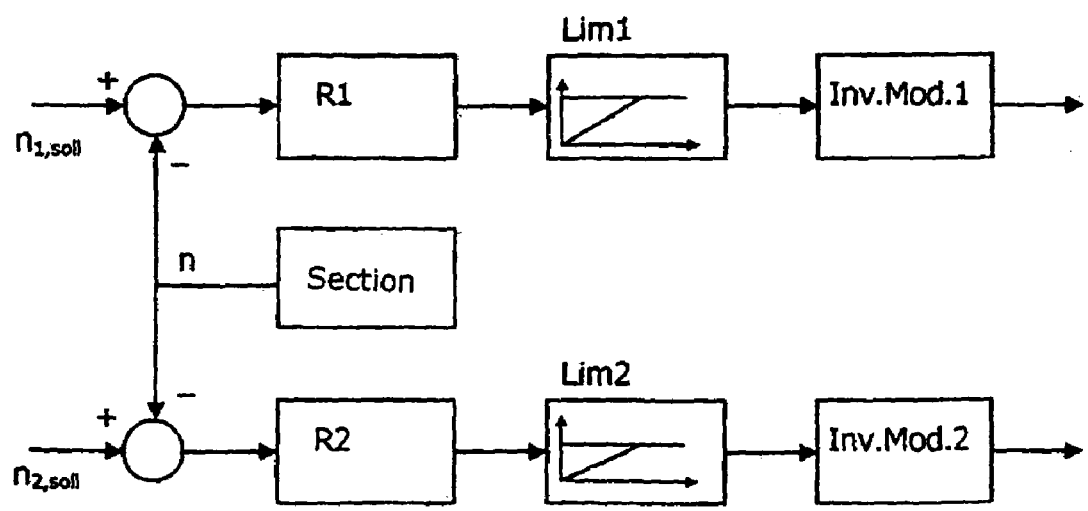
Figure 18:
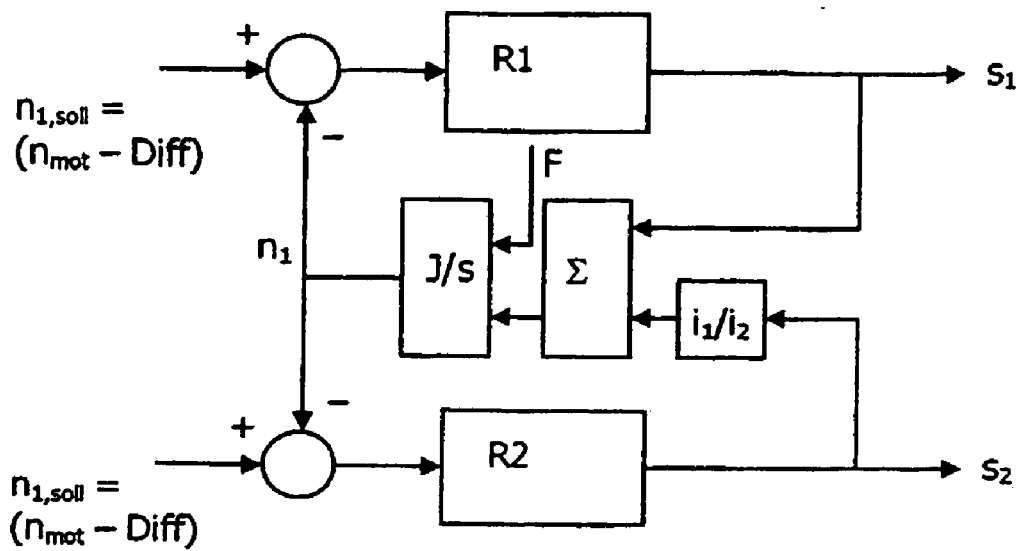
Figure 19:
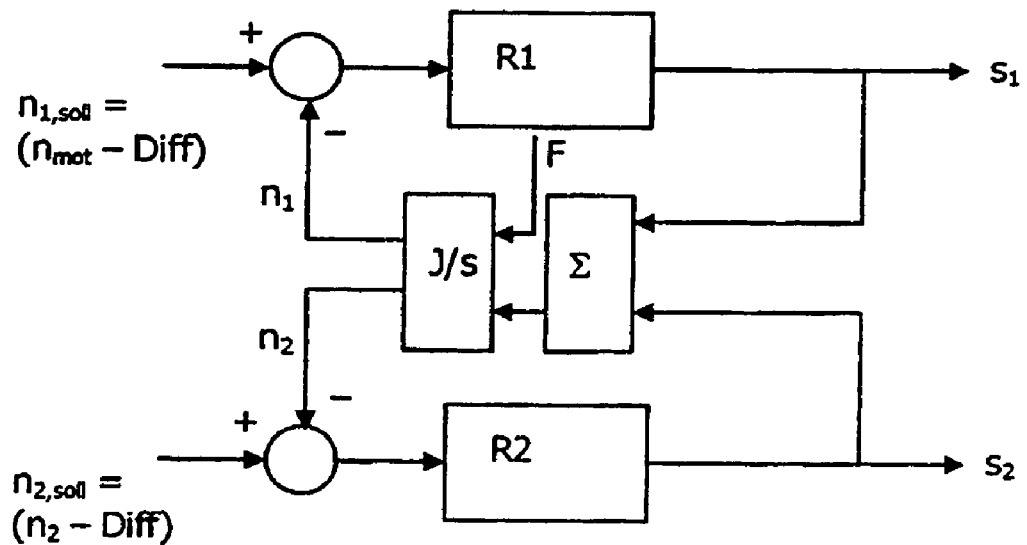

The invention is described by way of example hereinafter with reference to the Figures in which:

FIG. 1 diagrammatically shows a twin-clutch transmission according to the invention, FIG. 2 shows the twin-clutch transmission of FIG. 1 in the transmission of a primary torque by way of the second gear and an additional torque by way of the third gear, FIG. 3 shows the twin-clutch transmission of FIG. 1 in the transmission of a primary torque by way of the second gear and an additional torque by way of the fifth gear, FIG. 4 shows the variation in respect of time of engine torque and input torques of the clutches or transmission paths, wheel torque and accelerator pedal position when carrying out a method according to the invention, FIG. 5 shows the variation in respect of time of torques of the transmission paths, engine speed and accelerator pedal position in a shift operation, FIG. 6 shows the variation in respect of time of engine speed, wheel torque and accelerator pedal position when starting off with a plurality of shift operations for a method according to the invention and a conventional method (broken-line curves), FIG. 7 shows the variation in respect of time of engine speed and transmission speed, wheel torque and accelerator pedal position when starting off with a plurality of shift operations for a method according to the invention and a conventional method (broken-line curves), FIG. 8 shows the variation in respect of time of clutch torques, engine speed and transmission input speed as well as the accelerator pedal position in the case of a deliberate initial disengagement of the clutch for a regulated slip mode of operation, FIG. 9 shows a view corresponding to FIG. 8 in the case of a permanently regulated slip mode, FIG. 10 shows a view corresponding to FIG. 8 in a starting phase in second gear, FIG. 11 shows a diagrammatic view illustrating the principle of the twin-clutch transmission with two rotary speed regulators R1, R2 for the clutches C1, C2 between the engine M and the transmission G, FIG. 12 shows the rotary speed ratios in a first rotary speed regulating method ('method 1$a$'), FIG. 13 shows the rotary speed ratios in a second rotary speed regulating method ('method 1$b$'), FIG. 14 shows a diagrammatic view illustrating the principle for identical regulator parametrisation with different reference value presettings ('method 1'), FIG. 15 shows a diagrammatic view illustrating the principle for different regulator parametrisation with the same reference value presettings ('method 2'), FIG. 16 shows a basic circuit diagram for a first regulator structure of the twin-clutch transmission, FIG. 17 shows a basic circuit diagram for a second regulator structure of the twin-clutch transmission, FIG. 18 shows a basic circuit diagram for a first regulator structure of the overall vehicle, and FIG. 19 shows a basic circuit diagram for a second regulator structure of the overall vehicle.

FIG. 1 diagrammatically shows the components of a twin-clutch transmission 10. As its input the transmission has a drive shaft I which in a vehicle is coupled to the crankshaft of the internal combustion engine (not shown). The input shaft I of the transmission 10 can be coupled by way of the diagrammatically indicated clutch C2 to a first input shaft E1 of the transmission 10 and independently thereof by way of a clutch C1 to a second input shaft E2 of the transmission, in the illustrated example the second input shaft E2 in the form of a hollow shaft being arranged concentrically around the first input shaft E1. Arranged at the input shafts E1, E2 are various gears which, to provide different gear stages, are coupled to loose or free gears on a first output shaft O1 and a second output shaft O2 respectively. When a gear is engaged the above-mentioned loose gears can be non-rotatably connected to the associated output shaft O1 and O2 respectively by way of sliding shift sleeves S1, S2, S3 and S4, in which case the output shafts O1, O2 are in turn coupled to a drive output shaft O of the transmission 10.

In a gear transmission of that kind in particular the design of the gears with a high overall transmission ratio is critical as the drive is from a small gear on the input side to a larger gear on the output side and the small gears determine the torque-transmitting capacity of the transmission, by virtue of their dimensions. The restricted transmission capacity for torques can be in part considerable and can be for example up to 50% of the nominal torque of the value which is typical for higher gears. In order to protect the corresponding gears, intervention is usually implemented by way of the control system of the internal combustion engine, with which a limitation in respect of the torque is effected or the amount of torque is reduced by regulation, above a certain limit. Therefore the transmission has to transmit no more torque than corresponds to its predetermined capacity.

FIG. 1 identifies the typical 'weak points' of a gear transmission 10 by broken-line circles. They occur at the first, second and in part also third gear and at the axle drive, that is to say the pinion of the output shaft which meshes with the crown wheel typically arranged at the differential. In start-off phases in first gear, for example in a transmission which is designed for a torque capacity of 450 Nm, only 280 Nm can be transmitted. When starting under full load therefore the engine must be cut back to a maximum of 280 Nm as otherwise the transmission would be damaged. The difference in relation to the full torque level of the internal combustion engine cannot be utilised.

In accordance with the invention, to improve that situation, the property of the twin-clutch transmission 10 is put to use, namely that there two paths are available for the transmission of torque. FIG. 2 shows in that respect the twin-clutch transmission 10 in the operating condition with active transmission paths identified. Unless otherwise mentioned, the shift sleeves S1 through S4 are in their neutral position. Primarily second gear is engaged, in respect of which torque is delivered from the drive shaft 1 by way of a first clutch C1, the hollow shaft E2, the gear Z8, the gear Z9, the shift sleeve S2 (which is in the position of second gear) and the gears Z3 and Z4 to the output shaft O. That first transmission path correspondingly transmits its nominal capacity, for example up to a torque value of 280 Nm.

If necessary the engine torque which is available over and above that (for example u0p to 450 Nm) is transmitted by the second clutch C2 by way of a second transmission path. In that case the second transmission path goes in FIG. 2 by way of the shaft E1, the gears Z1 and Z2, the shift sleeve S1 (which is in the position of third gear) and the gears Z3 and Z4 to the output shaft O. In other words the second gear is assisted by the transmission of an additional torque by way of the third gear. The engine torque of 170 Nm which is available over and above the torque transmission capacity of 280 Nm is not suppressed as in the state of the art by cutting back the engine, but is available for use. As the method is preferably used only at high torque levels, problems with a technically difficult and defective regulating resolution in the range of lower torque levels are also eliminated.

FIG. 3 shows a situation which is modified in relation to FIG. 2 in that the second transmission path is taken by way of the fifth gear. It therefore embraces the clutch C2, the shaft E1, the gears Z5 and Z6, the shift sleeve S3 (which is in the fifth gear position) and the gear Z7 belonging to the axle drive. With this design configuration of the transmission therefore the additional torque is passed to the vehicle by way of a second axle drive (combination of pinion and crown wheel at the differential).

FIG. 4 shows in parallel relationship the variation in respect of time of the engine torque $M_{Mot}$ and the input torque in the first transmission path $M_{G1}$ and in the second transmission path $M_{G2}$ respectively (upper diagram), the variation in respect of time of the torque $M_R$ at the wheel which corresponds to the vehicle acceleration (middle diagram) and the variation in respect of time of the relative accelerator pedal position, wherein 100% corresponds to a completely open throttle valve (full acceleration) (lowermost diagram). The input torque $M_{G1}$ at the first clutch must be limited at an upper limit $M_{G1max}$ in order to protect the first transmission path from damage. As explained hereinbefore in the state of the art that limitation is implemented by suitably cutting back the engine. In the proposed twin-clutch transmission however the described parallel transmission of torque takes place by way of the second transmission path so that corresponding input torques $M_{G2}$ occur at the second clutch when the input torque $M_{G1}$ of the first clutch hits the upper limit $M_{G1max}$. Accordingly the total ($M_{G1}+M_{G2}$) of the input torques means that an engine torque $M_{Mot}$ which rises up to its maximum value can be transmitted. Therefore for example in a start-off phase under full load, the entire torque made available by the engine can be used.

If in the course of travelling the accelerator pedal position is brought back by the driver and the driver requires less torque, firstly the additional torque in the second transmission path $M_{G2}$ is reduced by correspondingly opening the associated clutch until finally, at the time $t_2$, the first transmission path used as the basis can again transmit all the engine torque $M_{Mot}$.

Parallel transmission of an additional torque by way of a second transmission path presupposes that the torque $M_{Mot}$ made available by the engine is compared to the currently prevailing upper limit which is admissible for the engaged gear and the mode of operation of the transmission. In the case of the stated upper limit being exceeded the excess proportion of the engine torque can then be diverted by way of the second transmission path. The upper limit of that diverted additional torque which is made available to the vehicle, at the wheel (or the upper limit in respect of vehicle acceleration) is derived from the currently prevailing operational configuration of the vehicle (for example front-wheel drive, rear-wheel drive or four-wheel drive). In the case of configurations which can be switched over, in that situation preferably the appropriate configuration is queried. In other cases the appropriate mode of operation of the transmission and the extent of the derived additional torque is ascertained automatically from the travel situation and the interaction of the driver with the accelerator pedal.

FIG. 5 shows one beneath the other the variation in respect of time of the torque passed by way of the first/second transmission path as indicated at $M_{G1}$ and $M_{G2}$ respectively (upper diagram), the variation in respect of time of the engine speed $n_{Mot}$ and the rotary speeds $n_{G1}$, $n_{G2}$ of the sub-transmissions (middle diagram) together with the variation in respect of time of the accelerator pedal position (lower diagram). In that case the twin-clutch transmission is controlled in such a way that the first and second transmission paths are used in parallel relationship not only in the starting phase, but in addition also until the shift point is reached for shifting from the first gear to the second gear or alternatively suitable further higher gears and gear combinations (time $t_1$).

FIG. 6 shows one beneath the other the variation in respect of time of the speeds of the engine at the transmission input with torque derivation according to the invention (solid curve $n_{Mot}$) and with a control system in accordance with the state of the art (broken-line curve $n_{Mot,0}$) (upper diagram); of the wheel torque with (solid curve $M_R$) and without (broken-line curve $M_{R,0}$) the torque derivation according to the invention (middle diagram); and the accelerator pedal position (lower diagram). By virtue of the higher degree of utilisation of the engine torque, the illustrated starting phase under full load involves a higher degree of acceleration of the vehicle, which leads to corresponding reductions in time $\Delta_1$, $\Delta_2$ and $\Delta_3$ for the shift processes into a higher gear stage.

The time for which the clutch associated with the second transmission path is transmitting torque in a slip mode is generally comparatively short. Therefore the involvement of lost output power at that clutch can be mastered without any problems. The reduction in the start-off phase, which is shown in FIG. 6, and the rise in the acceleration characteristic, involves an increase in road performance and thus permits optimisation of the cooling and hydraulic systems. As the shorter start-off time means that the total amount of lost energy introduced into the transmission decreases, the cooling system can be of a correspondingly smaller design configuration. In that respect it is to be noted that starting under full load is one of the critical design points for a transmission cooling system as it is here that large amounts of lost power have to be dissipated. As, at low travel speeds, the flow around the radiator is only slight, the radiator has a correspondingly poor level of efficiency. In addition in the case of twin-clutch transmissions with wet clutches, the system must be cooled by the circulation of oil. As the speeds used for starting off are low, the pump capacity must be made correspondingly high when designing the hydraulic system in order to provide the required delivery amount. In principle however the attempt is made to keep the delivery amount of the pump as low as possible in order to minimise the drive power required for driving the pump (drive power pump=delivery flow*pressure). That is particularly important as the pump represents the greatest consumer in a twin-clutch transmission and thus substantially influences the consumption of the vehicle.

As a secondary aspect, the method proposed herein now succeeds in reducing the overall involvement of the lost energy by virtue of an increase in the torque available for starting off. The radiator can be reduced in size and the delivery output of the hydraulic system can thus also be reduced, which has a positive effect on the energy consumption of the transmission system.

FIG. 7 shows a view substantially corresponding to FIG. 6, wherein the upper diagram, besides the engine speeds $n_{Mot}$ and $n_{Mot,0}$ also represents the input speed $n_G$ of the next higher gear. As with the method according to the invention an alternative torque path is already completely prepared and in that respect typically involves the next higher gear, manually effected upward shifts (time $t_s$) can be implemented directly and without a time delay. The required torque-transmitting paths and clutches are already fully at their working point. As a result, the time saving $\Delta_1$ shown in the upper diagram is achieved in the shift operation. A further time saving $\Delta_2$ is achieved by virtue of the fact that the subsequent engine speed adaptation phase can be carried out more rapidly because the existing wheel torque is in part already being carried by the next higher gear. The change in acceleration which occurs (jerk) is thus smaller and, in spite of the reduction in time, is perceived by the driver as being comfortable. The method therefore affords enhanced road performance and faster execution in particular of manually implemented upward shifts.

Due to the shortened shift time, the time of the upward shift can also be displaced towards higher engine speeds. In that way the available power output can be better utilised, which in turn benefits the vehicle acceleration.

In order to achieve good controllability for the system in the parallel transmission of torque, the clutches which work at distributing the load are preferably kept in a slip mode of operation. That provides that the torques at the clutches are clearly known and defective adjustment of torques or indeed locking-up of the transmission are effectively prevented.

In that respect there is a first method as illustrated in FIG. 8. FIG. 8 in the upper diagram shows the variation in respect of time of the torque $M_{C1}$ at a first clutch and $M_{C2}$ at a second clutch, while in the middle diagram it shows the associated variations in the engine speed $n_{Mot}$ as well as the transmission input speed $n_G$. The accelerator pedal position is once again shown in the lowermost diagram.

After a normal start-off procedure which is concluded by the first clutch being completely closed, no slip occurs at the clutch. The torque transmission capacity of the clutch is for that purpose raised slightly above the level of the torque produced by the engine. If now at time $t_3$ the driver further actuates the accelerator pedal and therefore calls for more torque, the clutch which previously was still slip-free is caused deliberately to slip. For that purpose it is possible to leave the clutch capacity at the previous level and to wait until the torque of the engine exceeds the torque transmission capacity of the clutch and the clutch begins to slip. Preferably however the clutch is caused deliberately to slip by a brief, actively controlled reduction in the transmission capacity. In that way the transition from the non-slipping to the slipping condition of the clutch can take place in a controlled manner. Accordingly effects which disturb the driver such as a change in the noise characteristics and the acceleration characteristics as well as overshoot of the engine speed can be deliberately suppressed.

After the attainment of the slipping condition with a suitable slight speed difference the second transmission path which is provided for diverting the additional torque is prepared and the appropriate clutch is actuated in such a way that a small amount of torque is transmitted. This ensures that, in the event of a further abrupt increase in the torque called for by the driver (that is to say at the time $t_4$ in FIG. 8) the torque capacity required for diverting the additional torque can be made directly available. If the vehicle has further accelerated until a shift is effected, the capacity required for diverting the torque in the new gear is preferably made available after shifting the gear.

FIG. 9 is a view corresponding to FIG. 8 showing an alternative operating procedure in which, after the conclusion of the start-off phase, the first clutch is not completely closed but is permanently operated with a suitable slight slip (see the circle in the upper diagram). That provides the prerequisites for suitable distribution of the torques to the clutches. The further procedure then takes place in a similar manner to the situation shown in FIG. 8.

FIG. 10 is a view corresponding to FIG. 8 and FIG. 9 respectively showing a specific start-off process. In this case the vehicle is not started in the lowest gear (that is to say first gear) but in a higher gear, in particular in second gear. For example in the operating mode 'Winter' this can make it possible for the vehicle to start in a manner which can be easily implemented by the driver, or in the case of vehicles of sporting orientation, consumption is to be reduced insofar as, in an urban cycle with the low levels of torque or partial loads involved therewith, starting is always effected in second gear. When starting in second gear in that way the clutch is now deliberately prepared for diverting additional torque (see the process in relation to FIGS. 8 and 9). If, after a partial load starting phase has begun, the driver wants a substantially greater degree of acceleration (time $t_4$ in FIG. 10), that can be made available directly by shifting into first gear. A possible alternative thereto would be diversion of the torque which is not to be transmitted by the second gear as a consequence of the limited torque transmission capacity, for example using third gear.

To sum up therefore there is provided a method of controlling twin-clutch transmissions in which the actuation of additional torque transmission elements, besides the base gear, increases the torque transmission capacity of the transmission. In that respect the additional torque can be diverted by way of suitable sub-transmissions and/or by way of another axle drive. Actuation of that mode of operation can be effected by a performance shift, by a selector shift for a four-wheel drive and/or by quick depression of the accelerator pedal in the start range. Torque distribution takes place in the sub-transmissions in a slipping mode of operation, wherein the latter is initiated by deliberately causing the clutch to slip or by leaving it to slip as a preparatory measure.

To prepare for full-load acceleration phases, the transmission branch which is not active preferably already takes over a torque-transmitting function in the range of partial loads. That applies both in respect of higher and also lower gears. If the driver steps on the accelerator the torque made available by the engine as its over-capacity can be directly diverted by way of the additional path. Thus it is possible to start for example in first gear and for the second gear to be in a readiness condition. Alternatively for example for consumption reasons in the urban cycle or in the so-called Winter mode the vehicle can basically be started in second gear. As soon as the driver calls for a high level of acceleration or full load, the transmission shifts to first gear, which provides a very high level of vehicle acceleration.

The twin-clutch transmission 10 is preferably designed in the region of the lower gears as a close ratio transmission, that is to say a transmission with close graduations or small differences in the transmission ratios between the gears. More specifically, the smaller the difference between two gears, the correspondingly more torque at the wheel and thus vehicle acceleration can be produced by the higher gear which is additionally used, from the diverted additional torque from the engine. In addition the power loss is reduced at the diverting second transmission path as the speed difference becomes less (in that respect the power loss is the product of the derived torque and the speed difference).

The control method indicated in FIGS. 8 and 9 is described in greater detail hereinafter by means of FIGS. 11 to 19. The underlying idea in that respect is not basing the regulating method on external torque parameters but carrying it out by means of a dual speed regulator. The proposed method therefore operates even without knowledge of torque parameters which are derived from the position of the accelerator pedal or from the engine performance graph, insofar as both clutches are caused to slip at the same time or are kept in a slipping condition at the same time and insofar as torque distribution of the clutches is distributed in accordance with the requirements of the travel situation and component load-bearing capability, by way of suitable presetting of regulating parameters.

While therefore hitherto the torques at the clutches were a function of engine torque, torque-carrying capability of the transmission and protection from overheating, they are now to be a function of the speed regulator. They are thus produced independently and in self-stabilising manner and internally of the transmission.

Set forth hereinafter in a first step is an advantageous implementation for determining the limit torques at which torque distribution takes place, from regulating values which are internal to the transmission, and an advantageous, autonomously operating method (steps 1a-1d). The proposed method of distributing the torques in the transmission to the different transmission paths then provides the desired predeterminable torque distribution in the transmission by means of rotary speed regulators (step 2).

Step 1—Determining the Torque at the Main Clutch (for Example First Gear, C1):

1a) The remaining deviation at the regulator R1 is used to determine the torque transmitted by the main clutch C1.

1b) The degree of saturation of the regulator for the main starting clutch is used to ascertain the torque applied at the clutch. Above a parameter limit the secondary starting clutch is used for load relief/torque diversion.

1c) The torque made available by the engine management system is not used for 're-distribution' in the transmission, but the 'inverse model' of the clutch, which is internal to the transmission, is used for load relief/torque diversion.

1d) The actuating pressure of the clutch of for example the first gear, which is significant for the torque which can be transmitted, is raised up to a given limit and then limited. All further increases in torque are absorbed by the alternative (for example second) gear.

Step 2—Regulating Method:

Two independent rotary speed regulators R1, R2 (FIG. 11) are used, which operate in parallel.

A rotary speed regulator R1 'deals with' the main work for example at the clutch C1 of the first gear and transmits all torques up to a given limit. In order to do that, a reference or target rotary speed $n_{1,soll}$ is predetermined for the regulator R1 as an input parameter. So that the clutch C1 remains in a slipping condition, that rotary speed differs slightly from the currently prevailing engine speed $n_{mot}$. In that case the regulator of the main clutch C1 is so adapted that it follows the predetermined reference rotary speed in the optimum fashion. The adaptation processes used for that purpose are known and are not considered herein.

The presetting of the reference rotary speed $n_{1,soll}$ of the clutch C1 is effected dynamically in dependence on the currently prevailing travel situation and the requirements which result therefrom. Thus it is appropriate for the deviation from the engine speed to be kept small if economical operation is required as the slip which is set by the regulator contributes proportionally to the losses of the transmission. In another situation it may be appropriate to deliberately set a large rotary speed difference between the engine speed $n_{mot}$ and the transmission input speed $n_1$ in order for example to produce a good rotational oscillation decoupling effect. As a consequence of its design any internal combustion engine produces rotational irregularities which cause rattling in the transmissions. By means of a greater speed difference, those rotational oscillation stimuli can be decoupled by means of the clutch system so that transmission rattle is avoided.

A rotary speed regulator R2 is also used for actuation of the clutch C2 (secondary or load relief path). Depending on the respective method employed that rotary speed regulator R2 receives either as the rotary speed $n_{2,soll}$ the rotary speed of the regulator R1 of the first gear (converted in accordance with the transmission ratios of the transmission paths, that is to say in accordance with the gear gap i) or a proportional deviation therefrom in accordance with the desired torque diversion parameter. In that respect the deviation of the reference rotary speed in relation to the actual rotary speed of the input shaft 1 is used to divert the excess torque of the first gear ('method 1a', see FIG. 12, i=gear gap; the greater the regulating deviation $\Delta n_2$, the correspondingly more torque is transmitted by the second transmission path); or as the reference rotary speed $n_{2,soll}$ the actual rotary speed of the second gear or a proportional deviation therefrom corresponding to the desired torque diversion parameter. In that case the deviation of the reference rotary speed with respect to the actual rotary speed of the input shaft 2 is used to divert the excess torque of the first gear ('method 1b', see FIG. 13, i=gear gap; the greater the regulating deviation $\Delta n_2$, the correspondingly more torque is transmitted by the second transmission path).

It can be clearly seen from the example of a P-regulator that its control parameter $s_1$ or $s_2$ (for example assumed as torque which can be converted by means of an inverse model of the clutch into the actuating pressure thereof) is proportional to the deviation of the reference value and the actual value. In the normal operating situation in which the engine M produces a torque $\tau_{mot}$ which does not exceed the load-bearing capability of the transmission G the regulator R1 of the clutch C1 will assume a working point at which all the torque produced by the engine is transmitted, for which reason the predetermined rotary speed difference (or the slip) remains constant.

If now the engine produces a torque $\tau_{mot}$ which exceeds the load limit of the transmission G, a reference rotary speed $n_{2,soll}$ with a deviation $\Delta n_2$ of greater than zero is predetermined for the regulator R2 of the clutch C2 (FIGS. 12 and 13). In that situation the regulator R2 will implement correspondingly more torque, the greater that deviation is. That can be easily explained by reference to the example of a P-regulator (see FIG. 14, 'method 1'). With a predetermined parameter P2 the control value s becomes correspondingly greater, the greater the deviation from the actual rotary speed becomes. As the actual rotary speed is fixed by the regulator R1 by means of the clutch C1 which is operated in a slip mode, an increase in the deviation of the regulator input values results in an increase in the torque transmitted by the clutch C2. If now the regulator output and thus the set torque of the clutch C1 is fixed or limited, it is possible for the torque produced by the internal combustion engine M beyond the torque capacity of the first gear to be diverted by way of the second gear and made available for acceleration of the vehicle.

Alternatively both rotary speed regulators R1, R2 receive the same reference rotary speeds or combinations of reference and actual rotary speed deviations, but are parameterised in different ways (FIG. 15, 'method 2'). Using the example of a so-called P-regulator it can be easily seen that, with a predetermined identical deviation of the reference and the actual values, the control signal is proportional to the parameter P. In that way the ratio of the two parameters P1 and P2 used in the regulators R1 and R2 determines the ratio of torque distribution.

Both clutches C1, C2 are operated in a slip mode in order to achieve clear determination of the load condition/torque transmission capacity in the transmission. The presettings for the rotary speed regulator of the alternative for example second gear which is used for torque diversion are implemented in accordance with the requirements for torque deviation in dependence on the situation involved. For that purpose inter alia either the presettings for example for the reference rotary speeds of the regulators involved or however the parametrisation concerned can be suitably preset. The ratio of the torque flows can in that case be clearly determined from the values (see FIG. 14—reference rotary speed presetting, FIG. 15—parameter change).

The method is also suitable for implementing a reduction in torque if for example wheel slip is detected and a reduction in wheel torque is wanted. For that purpose the clutch of the main torque path is operated in a slip mode and the entire torque of the engine is transmitted for that mode of operation. If now the second clutch is brought into engagement in the manner proposed in the method, a desired locking condition occurs, the torque applied at the clutch of the secondary path diminishing the overall forward drive. That mode of operation is particularly advantageously possible with the proposed regulation strategy as both clutches are operated in a slip mode, for which reason the applied torques are very precisely known and can be very well controlled by the rotary speed regulators.

FIGS. 16 through 19 show various simple regulator structures which explain the above-discussed principle.

FIG. 16 shows the principle by way of example. In the present example a reference rotary speed $n_{1,soll}$ is used as the input value, and the presetting of the actual rotary speed n is the same for both regulators R1, R2. Torque distribution is achieved by way of different reference rotary speeds (method 1a) or different parametrisation (method 1b). The output value of the regulator is the torque to be set at the clutch. That is linearised by way of an inverse model (Inv.Mod.) of the clutch. That has the advantage that functioning of the overall system becomes substantially more stable and, as a consequence of the linearisation of the essential components, the regulators can be tuned in a substantially better and more stable fashion as the deviations which are to be regulated out are substantially reduced in magnitude. Regulation can thereby also be substantially improved with simple regulator designs, which is to the benefit in particular of the dynamics and the available control reserve. It is further advantageous that, for adaptation, the components which are to be correspondingly corrected can be associated directly in the inverse model and parameterised. It is also possible for that regulator concept to be designed in accordance with stability criteria which are known to the man skilled in the art and for it to be so securely tuned in the course of the development process that in the field stable operation within known limits is guaranteed, which is not possible for example with fuzzy regulating concepts.

A current presetting is produced as an output, which by means of a regulator circuit for the electric current is used for producing the actuation pressure of the valves used by the clutch.

FIG. 17 shows a proposal for a regulator structure in which the output values of the regulators R1, R2 are limited in accordance with the requirements of the torque capacity of the transmission paths (F=travel resistances). Thus it is possible for example to ensure that limiting the clutch C1 which is assumed to be the main clutch means that nothing more than the limit torque which is permissible for the transmission is transmitted. Limitation of the output value of the clutch C2 in the secondary path ensures that undesired locking does not occur in the transmission. For that purpose it is appropriate that the torques transmitted by the two clutches, taken together, are no greater than the torque which is made available by the internal combustion engine. In a corresponding manner it is advantageous that the total of the 'enabled' torques of the limiters Lim1 and Lim2 are smaller than or equal to the engine torque in order to prevent locking.

FIG. 18 shows a proposal for regulator implementation in accordance with method 1a or 2, wherein the rotary speed $n_1$ of the input shaft 1 is predetermined for the regulators R1, R2 as the actual speed. So that this becomes possible, it is advantageous for the rotary speed of the second gear to be suitably parameterised with the currently prevailing transmission gap. Presetting of the input values and parameterisation of the regulators is effected in accordance with the proposals of method 1 or 2.

FIG. 19 shows a proposal for regulator implementation in accordance with method 1b or 2, wherein the rotary speed $n_1$ of the input shaft 1 is predetermined for the regulator R1 as the actual speed and the rotary speed $n_2$ of the input shaft 2 is predetermined for the regulator R2 as the actual speed. The regulator now receives the presetting from a second actual rotary speed, which affords advantages in regard to operational reliability as a second rotary speed sensor is used. Presetting of the input values and parameterisation of the regulators is effected in accordance with the proposals of method 1 or 2.

The invention claimed is:

1. A method of controlling a twin-clutch transmission (10), wherein torque is transmitted from a drive shaft (I) to an output shaft (O) via a first clutch (C1) and via a first transmission path (E2, Z8, Z9, S2, Z3, Z4), and with a second clutch C2) being at least partially closed in order to transmit an additional torque from the drive shaft (I) to the output shaft (O) via a second transmission path (E1, Z1, Z2, S1, Z3, Z4; E1, Z5, Z6, S3, Z7) when the torque transmitted by way of the first clutch (C1) reaches a predetermined upper limit; said method comprising the steps of:

comparing torque ($M_{Mot}$) provided by an engine with a current permissible upper limit for a selected gear and an operating mode of the transmission, said current permissible upper limit being selected to ensure that the first transmission path is protected from a torque overload; and diverting an excess component of the torque ($M_{Mot}$) via the second transmission path responsive to said current permissible upper limit being exceeded.

2. A method as set forth in claim 1 wherein the first clutch (C1) and the second clutch (C2) are operated with slip.

3. A method as set forth in claim 1 wherein a parallel activity of the first and the second transmission paths is maintained until a switch is made from the first transmission path to a new transmission path.

4. A method as set forth in claim 1 wherein the second clutch (C2) is closed only to such an extent that the additional torque does not exceed the predetermined upper limit which is dependent on the operating mode.

5. A method as set forth in claim 1 wherein the first clutch (C1) is operated with a small degree of slip.

6. A method as set forth in claim 1 wherein the first clutch (C1) is operated with a small degree of slip when a rise in the power demand is predicted or occurs.

7. A method as set forth in claim 1 wherein the first transmission path corresponds to a relatively high gear and the second transmission path corresponds to a relatively low gear.

8. A twin-clutch transmission (10) comprising:

at least a first clutch (C1) and a second clutch (C2) for the transmission of torque from a drive shaft (I) to an output shaft (O) respectively via a first transmission path (E2, Z8, Z9, S2, Z3, Z4), and a second transmission path (E1, Z1, Z2, S1, Z3, Z4; E1, Z5, Z6, S3, Z7), and a controller for actuation of the clutches, said controller for comparing torque ($M_{Mot}$) provided by an engine with a current permissible upper limit for a selected gear and an operating mode of the transmission, said current permissible upper limit being selected to ensure that the first transmission path is protected from a torque overload; and for controlling said second clutch (C2), said controller for diverting an excess component of the torque ($M_{Mot}$) via the second transmission path responsive to said current permissible upper limit being exceeded.

9. A twin-clutch transmission as set forth in claim 8 wherein two different output gears (Z4, Z7) for introducing torque into an axle transmission.

10. A twin-clutch transmission as set forth in claim 9 wherein a quotient of the transmission ratios between the first and the second gear and between the second and the third gear is less than 1.5.

* * * * *